United States Patent
Yang et al.

(10) Patent No.: US 9,065,757 B2
(45) Date of Patent: Jun. 23, 2015

(54) NETWORK DEVICE AND METHOD OF ROUTING TRAFFIC

(75) Inventors: Liu Yang, Hangzhou (CN); Haifeng Zhao, Hangzhou (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 139 days.

(21) Appl. No.: 13/813,112

(22) PCT Filed: Jul. 29, 2011

(86) PCT No.: PCT/CN2011/001244
§ 371 (c)(1),
(2), (4) Date: Jan. 29, 2013

(87) PCT Pub. No.: WO2012/013022
PCT Pub. Date: Feb. 2, 2012

(65) Prior Publication Data
US 2013/0142034 A1 Jun. 6, 2013

(30) Foreign Application Priority Data

Jul. 29, 2010 (CN) .......................... 2010 1 0241015

(51) Int. Cl.
*H04L 12/28* (2006.01)
*H04L 12/707* (2013.01)
*H04L 12/751* (2013.01)
*H04L 12/703* (2013.01)

(52) U.S. Cl.
CPC .................. *H04L 45/22* (2013.01); *H04L 45/02* (2013.01); *H04L 45/28* (2013.01)

(58) Field of Classification Search
None
See application file for complete search history.

(56) References Cited

U.S. PATENT DOCUMENTS

| | | |
|---|---|---|
| 6,711,152 B1 * | 3/2004 | Kalmanek et al. ............ 370/351 |
| 2005/0083844 A1 * | 4/2005 | Zhu et al. ................... 370/230.1 |
| 2006/0067330 A1 * | 3/2006 | Schollmeier et al. .... 370/395.31 |
| 2006/0168317 A1 * | 7/2006 | Charzinski et al. ........... 709/238 |

(Continued)

FOREIGN PATENT DOCUMENTS

| | | |
|---|---|---|
| CN | 101075970 | 11/2007 |
| CN | 101420384 | 4/2009 |
| EP | 1261178 | 11/2002 |

OTHER PUBLICATIONS

International Search Report and Written Opinion dated Oct. 27, 2011, PCT Patent Application No. PCT/CN2011/001244 filed Jul. 29, 2011, the State Intellectual Property Office, the P.R. China.

(Continued)

*Primary Examiner* — Duc C Ho
(74) *Attorney, Agent, or Firm* — Mannava & Kang, P.C.

(57) ABSTRACT

A method for routing switch is disclosed. The method comprises: when a network device forwards traffic through N equal-cost multi-path (ECMP) routes to a destination, if M of these routes are inactive, then for each inactive route, determining an alternative route for replacing the inactive route from N-M active routes, and modifying the inactive route to the alternative route so as to switch the traffic of the inactive route onto the alternative route, wherein N and M are positive integer numbers, with N being greater than or equal to 2 and M being greater than or equal to 1 and smaller than N.

7 Claims, 8 Drawing Sheets

(56) References Cited

U.S. PATENT DOCUMENTS

2011/0007629 A1* 1/2011 Atlas et al. .................. 370/225
2011/0069706 A1* 3/2011 Sen et al. .................... 370/392

OTHER PUBLICATIONS

CN First Office Action dated Aug. 1, 2013 issued on CN Patent Application No. 201010241015.9 dated Jul. 29, 2010, The State Intellectual Property Office, P.R. China.

CN Second Office Action dated Mar. 20, 2014, CN Patent Application No. 201010241015.9 dated Jul. 29, 2010, The State Intellectual Property Office, P.R. China.

CN Third Office Action dated Sep. 3, 2014, CN Patent Application No. 201010241015.9 dated Jul. 29, 2010, The State Intellectual Property Office, P.R. China.

English translation of Gong Tiezhu, "A Solution of IP Fast Reroute Based on BFD", Hangzhou H3C Technologies Co., Ltd., May 15, 2009.

* cited by examiner

NETWORK DEVICE AND METHOD OF ROUTING TRAFFIC

BACKGROUND

During network communication, traffic is generally transmitted to a destination through a selected route. When the selected route is inactive, the traffic through this inactive route cannot arrive at the destination, i.e. a traffic interruption occurs.

DETAILED DESCRIPTION

Figure 1:
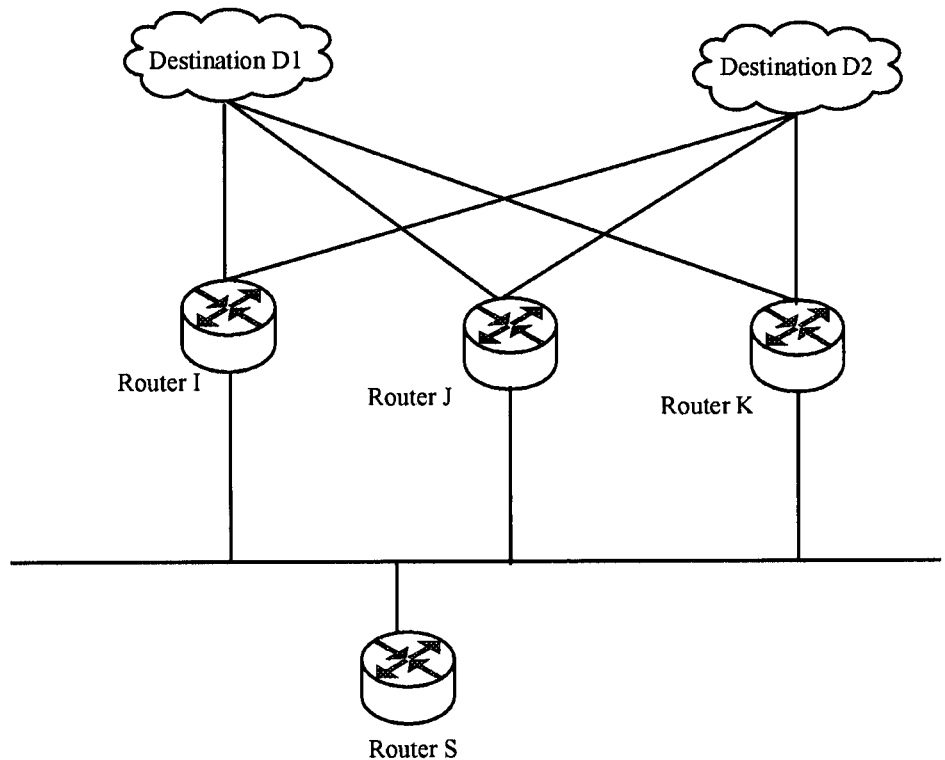
FIG. 1 is a schematic drawing of an example of a network comprising a network device for routing traffic.

In network communication, if a network device (such as a router or switch with layer 3 capability for instance) maintains multiple equal-cost multi-path (ECMP) routes to a destination, the network device generally will equally divide the traffic transmitted to the destination into a number of parts, with the number corresponding to the number of the ECMP routes. As shown in FIG. 1, the router S maintains three ECMP routes to the destination D1, which are respectively a route whose next hop is the router I, a route whose next hop is the router J, and a route whose next hop is the router K. If the router S needs to forward traffic to the destination D1, then as shown in FIG. 1, the router S will equally divide the traffic into three parts, which are forwarded through the above-mentioned three ECMP routes, respectively.

In the context of this disclosure the term 'inactive route' is used to describe a route which is not currently working, e.g. due to a temporary network failure, or a route which is invalid and needs to be deleted.

If during traffic forwarding, one of the ECMP routes turns out to be inactive, a traffic interruption occurs. For example, in FIG. 1, if the route whose next hop is the router K is inactive due to a failure occurring to the link between the router S and the router K, then the traffic passing through this inactive route cannot arrive at the destination D1. This traffic interruption will continue until the router S updates the ECMP routes to the destination D1 according to the routing update information sent by a routing protocol module. The routing protocol module may be part of the router S (for instance a set of machine readable instructions operating on a processor of the router). When the routing protocol module detects the network failure, it re-calculates the ECMP routes to the destination D1 according to the current valid network topology and sends routing update information to the router S. It can be seen that the duration of traffic interruption is a sum of the time taken to detect that the route is inactive, the time taken for the routing protocol module to re-calculate the routes and the time taken to downwardly refresh the recalculated routes. The time taken is generally quite long and may not meet the needs of current networks.

In order to shorten the duration of traffic interruption, a proposed solution is IP fast re-routing (FRR). The basic principle of said solution is to calculate a standby route in advance, and once an inactive route is detected, the standby route is used immediately to replace the inactive route for traffic forwarding, such that the duration of traffic interruption is reduced to a sum of the time for detecting that the route is inactive and the time for replacing the inactive route with the standby route. This shortens the duration of traffic interruption compared to the above-mentioned solution. The IP FRR scheme is described below in detail with reference to the network of FIG. 1 as an example.

Step 1, the router S generates the routing information with respect to a destination D1.

This step is mainly performed after the router S has learned the ECMP routes to the destination D1, wherein the routing information particularly includes the corresponding relations between the destination D1 and the primary and standby routes to the destination D1. Here, the primary route and standby route are determined by the router S from the learned ECMP routes according to the IP FRR algorithm after learning the routes to the destination D1. As shown in FIG. 1, if the router S learns that there are three corresponding ECMP routes to the destination D1, which are respectively the route whose next hop is the router I, the route whose next hop is the router J, and the route whose next hop is the router K, and assume that the router S determines according to the IP FRR algorithm that the route whose next hop is the router J is the standby route, and the other two routes are the primary routes, then the routing information generated is as shown in FIG. 2.

Figure 2A:
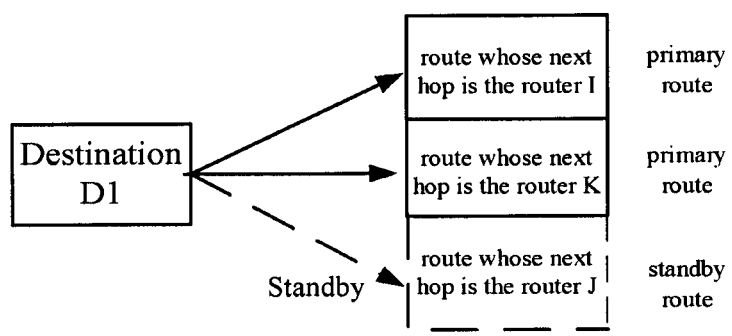
FIGS. 2a-2c are schematic drawings of the routes when forwarding the traffic in an example IP FRR scheme.

Step 2, when the router S forwards traffic to the destination D1, it equally divides said traffic into two parts, which are forwarded through the two primary routes shown in FIG. 2a, respectively, while the standby route does not participate in the actual forwarding.

Figure 2B:
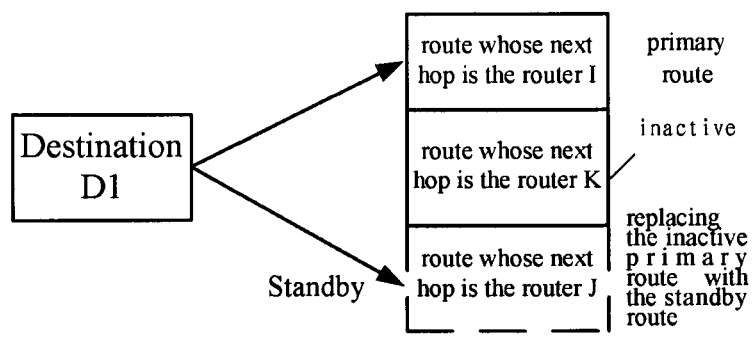
Figure 2C:
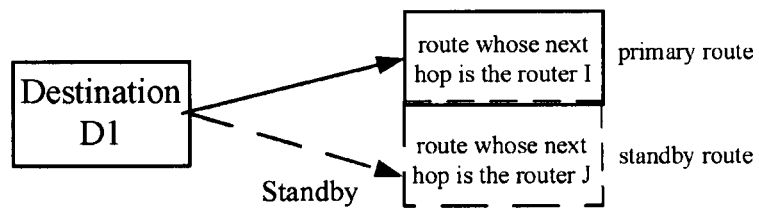

Step 3, during the traffic forwarding in step 2, if any primary route becomes inactive, for example, the route whose next hop is the router K becomes inactive, the standby route shown in FIG. 2a is enabled to replace the inactive primary route to forward the traffic of the inactive route, and FIG. 2b shows the details thereof.

It can be seen that in the IP FRR scheme, if the primary route becomes inactive, the traffic of the inactive primary route is directly switched onto the standby route, thus reducing the time of traffic interruption.

Step 4, during the traffic forwarding in step 3, when the router S learns the routing update information downwardly refreshed by the routing protocol module, it re-determines the primary routes and standby routes to the destination according to the routing update information.

In this step, since the route whose next hop is the router K has inactive, the routing update information newly learned by the router S does not include a route whose next hop is the router K, but includes only routes whose next hops are the routers I and J. Thus in this step, the router S can determine a primary route and a standby route from the routes whose next hops are the routers I and J according to the IP FRR algorithm. Suppose that it is determined herein that the route whose next hop is the router J is the standby route, then FIG. 2a is changed into FIG. 2c. Subsequently, the router S forwards collectively the traffic destined for the destination D1 through the next hop router I.

In the following a method for routing traffic with a network device according to an example of the present disclosure is described with reference to FIG. 3 through FIG. 6e.

The method according to the example mainly comprises: when a network device (e.g. a router or switch with layer 3 capability) forwards traffic via N ECMP routes to a destination, if M of these routes are inactive, then for each inactive route, determining an alternative route from N-M active routes to replace the inactive route and modifying the inactive route to the alternative route so as to switch the traffic forwarded by the inactive route onto the alternative route. In other words, according to the example, during the traffic forwarding, if any route becomes inactive, said inactive route is replaced directly by a route that is active in the original routes to forward the traffic, so the traffic interruption time can certainly be shortened. Besides, this method does not need a standby route, instead it replaces the inactive route directly with an original active route for forwarding traffic, so it will avoid the problems like increased computation complexity and waste of network resources due to reserving the standby route.

In said method, N and M are positive integer numbers, with N being greater than or equal to 2 and M being greater than or equal to 1 and smaller than N.

In said method, the network device may be particularly implemented as a router or a switching device with a routing function, etc. With the network device being a router, the present invention will be described in further detail below in conjunction with examples and with reference to the drawings.

Figure 3:
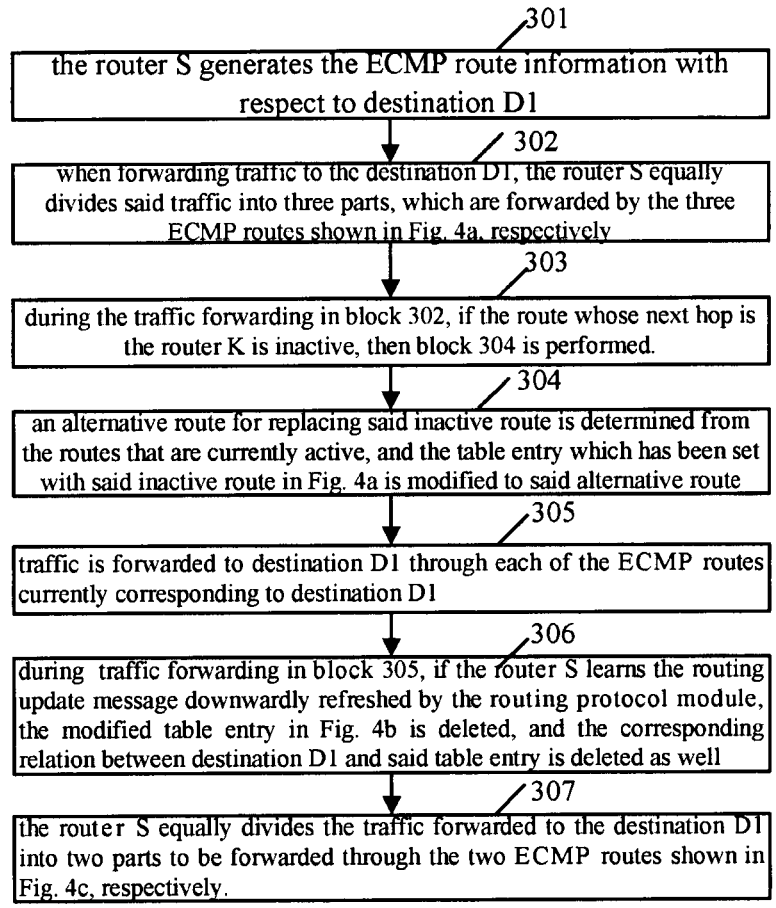
FIG. 3 is a flow chart of a method for routing traffic according to an example.

Referring in particular to FIG. 3, which is a flow chart of a method for routing traffic with a network device according to an example of the present disclosure. While the flow chart uses N=3 and M=1 as an example, the principles of implementation also apply to other cases. As such, with reference to the example network shown in FIG. 1, said method may include the following processes as shown in FIG. 3:

Block 301, the router S generates the equivalent routing information with respect to destination D1.

This block 301 is performed after the router S initially learns the routes to the destination D1, wherein said ECMP routing information may in particular be relevant routing table entries regarding D1 in a routing table, including the corresponding relations between the destination D1 and each of the ECMP routes. For example, in FIG. 1, the router S learns that there are three ECMP routes to the destination D1, which are respectively the route whose next hop is the router I, the route whose next hop is the router J, and the route whose next hop is the router K. As such, the equivalent routing information generated in block 301 may be as shown in FIG. 4a.

Figure 4A:
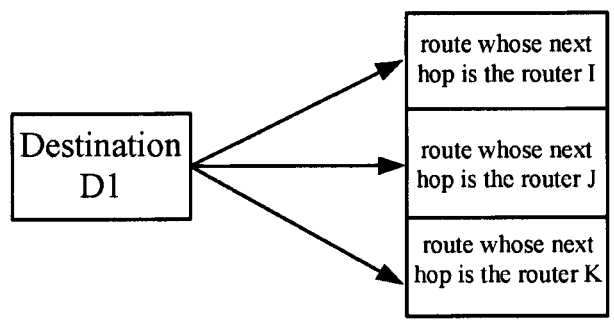
FIGS. 4a-4c are schematic drawings of the routes adopted when forwarding the traffic according to an example.

Block 302, when forwarding traffic to the destination D1, the router S equally divides said traffic into three parts, which are forwarded through the three ECMP routes shown in FIG. 4a, respectively.

In other words, each of the three ECMP routes shown in FIG. 4a forwards ⅓ of the total traffic sent to the destination D1.

Block 303, during the traffic forwarding in block 302, if the route whose next hop is the router K becomes inactive, then block 304 is performed.

Block 304, alternative route for replacing the inactive route is determined from the routes that are currently not inactive, and the table entry set with said inactive route in FIG. 4a is modified to said alternative route.

In this example, if the number of inactive routes equals to the number of the remaining active routes and is greater than or equal to 2, then block 304 can determine the alternative route for replacing the inactive route according to the load balancing principle when performing the determining operation, thereby avoiding subsequent switching the traffic of all inactive routes onto some route that is active. For instance, if there are four ECMP routes corresponding to destination D1, which are denoted as routes 1-4, and two of the routes, e.g. routes 1 and 2 become inactive during the traffic forwarding process, then these two inactive routes may be replaced by the other two routes, i.e. routes 3 and 4, which are active, rather than replacing said two inactive routes with only one active route, and this can further guarantee the reliability of traffic forwarding. Of course, if the number of inactive routes is different from the number of active routes, for instance, if the number of inactive routes is greater than the number of active routes, or the number of inactive routes is less than the number of active routes, an alternative route for replacing individual inactive routes can be chosen arbitrarily from the routes that are active, or the alternative route for replacing individual inactive routes can be chosen in a polling way from the routes that are active, without any specific limitation made herein. Wherein, choosing an alternative route for replacing a inactive route in a polling way from active routes particularly includes: polling the active routes in order, determining the polled routes to the alternative routes for the inactive routes in sequence, and if there are still inactive routes for which no alternative routes are determined after all the active routes have been polled, polling again until a corresponding alternative route is determined for each of the inactive routes. For example, there are 5 routes to the destination D1, which are denoted as routes 1-5. If three routes, e.g. routes 1-3 become inactive during the traffic forwarding, then the rest two routes that are active are polled in order, and the route that is polled first, i.e. route 4, is determined to be the alternative route for the inactive route 1, and the route that is polled next, i.e. route 5, is determined to be the alternative route for the inactive route 2, then the active routes are re-polled in order, and the route that is polled first, i.e. route 4, is determined to be the alternative route for the inactive route 3.

In this example, there are three ECMP routes in FIG. 4a, one of which, i.e. the route whose next hop is the router K, becomes inactive and the other two are active. In this case, when it comes to block 304, an alternative route may be chosen for the route whose next hop is the router K in a way used when the number of inactive routes is different from the number of active routes as described above. Suppose that the inactive route is replaced by the route whose next hop is the router I, then the table entry set with said inactive route may be modified to the route whose next hop is the router I, as shown in FIG. 4b in detail.

It shall be noted that block 304 can be performed when the router S has not learned the routing update message downwardly refreshed by the upper layer, and the purpose thereof is to shorten the time of traffic interruption caused by the inactive route, which is because that on the one hand, the inactive route as well as the corresponding relation between the destination and the inactive route can only be deleted after the routing update message sent by the routing protocol module is learned, but the routing update message has not been received at the time, so neither the inactive route nor the corresponding relation between the destination and the inactive route can be deleted, which indicates that if block 304 is not performed, the traffic interruption will continue until the router S learns the routing update message, which usually takes a long time; on the other hand, a routing reverse refreshing flag can be set when a route becomes inactive, i.e. a module to manage routing in the router S directly informs the routing protocol module of the inactive route information so that the routing protocol module can downwardly refresh the routing update message as soon as possible. However, the downward refreshing of the routing update message is performed after the routing protocol module re-calculates the routes according to the normal network topology, and it usually takes a long time for the routing protocol module to calculate the routes. Furthermore, even if the router S has received the routing update message, when there are multiple destinations on the router S which correspond to said inactive route, said inactive route as well as the corresponding relation between said inactive route and each of the destinations has to be deleted one by one, and this need a rather long time. Based on the above two aspects, in order to increase the routing switch speed, the present example no longer relies on the routing update message, instead it directly performs block 304, so that the route that is active replaces the inactive route to forward traffic, which is described in the following block 305 in detail.

Block 305, traffic is forwarded to the destination D1 through each of the ECMP routes currently corresponding to the destination D1.

Figure 4B:
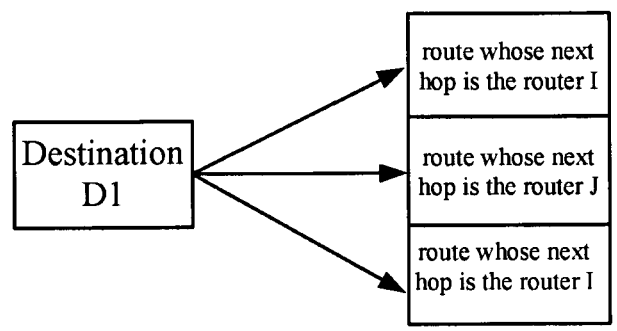

FIG. 4b shows that the destination D1 still corresponds to three table entries, with two of the table entries being set with a route whose next hop is the router I and the other table entry being set with a route whose next hop is the router J. Thus when proceeding to block 305, the traffic to be forwarded to the destination is still equally divided into three parts to be forwarded respectively by routes in the three table entries shown in FIG. 4b. It can be seen that when proceeding to block 305, the traffic forwarded by the route whose next hop is the router J remains unchanged, and it still forwards ⅓ of the total traffic sent to the destination D1, while the route whose next hop is the router I needs to forward ⅔ of the total traffic sent to the destination D1, i.e. ⅓ traffic that was originally forwarded by the inactive route is added to the ⅓ traffic it used to forward.

It can be seen that when a route becomes inactive, the present example directly switches the traffic of the inactive route to the currently used routes that are active without depending on the routing update message, so that the time of traffic interruption is reduced to a sum of the time for detecting that the route is inactive and the time for replacing the inactive route with an active route (which is relatively short). Moreover, the present example does not need a standby route, which is not used in the actual forwarding when the primary routes are normally operative. Further, a loop usually occurs when a standby route is used, and in order to achieve zero loops throughout the network, a very complicated computation is required. However, the present example directly replaces the inactive route with an active route for originally forwarding traffic, so it will avoid the problems like increased computation complexity and waste of network resources due to reserving a standby route.

Block 306, during the traffic forwarding process in block 305, if the router S learns the routing update message downwardly refreshed by the upper layer, the modified table entries in FIG. 4b will be deleted, and the corresponding relation between destination D1 and said table entries will be deleted as well.

That is to say, block 305 only temporarily replaces the inactive route with an active route to forward traffic, and this only continues until the router S learns the routing update message.

Figure 4C:
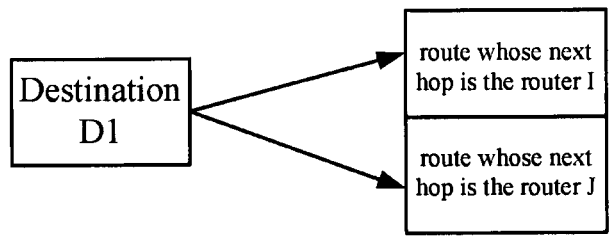

In block 304, to facilitate identification of a modified table entry, a modification mark may be made thereto upon completion of the modification of the table entry. For example, the third table entry shown in FIG. 4b is modified in block 304, so a modification mark (not shown in FIG. 4b) may be made at the third table entry shown in FIG. 4b. Thus when proceeding to block 306, the table entry with a modification mark may be deleted directly and the corresponding relation between said table entry and the destination D1 may be deleted as well, as shown in FIG. 4c. At this point, the routing information shown in FIG. 4c includes only the corresponding relations between the destination D1 and two ECMP routes, i.e. the routes whose next hops are the routers I and J respectively.

Block 307, the router S equally divides the traffic forwarded to the destination D1 into two parts to be forwarded through the two ECMP routes shown in FIG. 4c, respectively.

In other words, each of the two ECMP routes shown in FIG. 4c forwards ½ of the total traffic sent to the destination D1. During the traffic forwarding, if one or more routes become inactive, the operation in the above-mentioned block 303 will be performed.

In networking, the routing resources are limited, so there may be the situation where the ECMP routes to different destinations are completely the same. Still taking FIG. 1 as an example, it can be seen that the ECMP routes from the router S to destinations D1 and D2 are the same, which are the route whose next hop is the router I, the route whose next hop is the router J and the route whose next hop is the router K. Thus the present example enables the two destinations to share a routing. Specifically, the shared routing may be disposed in a virtual next hop (VN) and the two destinations are made to correspond to said VN, respectively. Details can be found in the following description.

Figure 5:
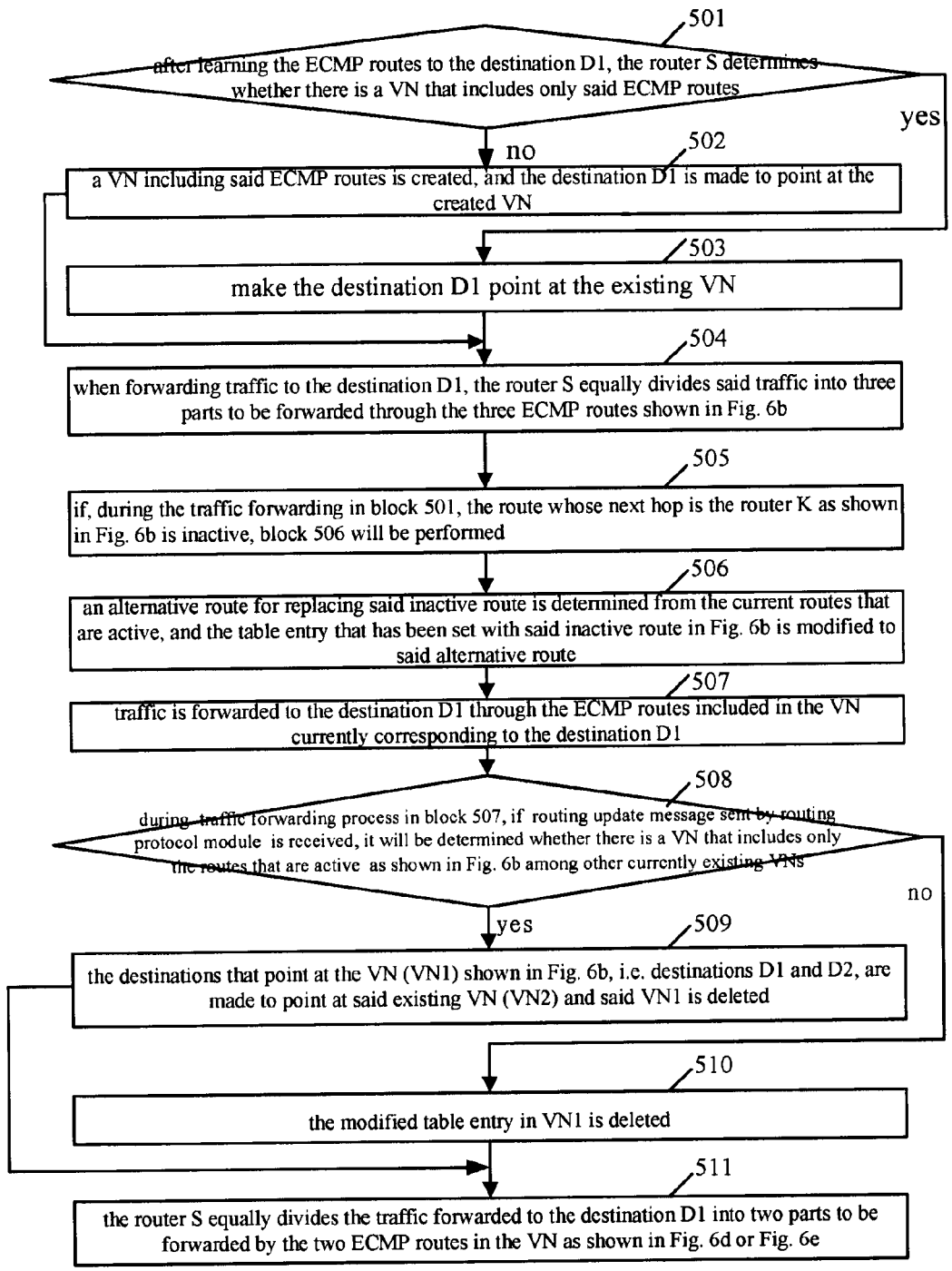
FIG. 5 is a flow chart of a method for routing switch according to another example.

Referring in particular to FIG. 5, which is the flow chart of another method for routing traffic according to another example. Said flow chart takes N=3 and M=1 mentioned previously as an example, and the principles of implementation also apply to other cases. As such, based on the network shown in FIG. 1, said flow may include the following as shown in FIG. 5:

Block 501, after learning the ECMP routes to the destination D1, the router S determines whether there is currently a VN that includes only said ECMP routes. If no, block 502 is performed; and if yes, block 503 is performed.

Here, suppose that the learned ECMP routes are the routes whose next hops are the routers I, I and K respectively, then the determination performed in block 501 is that the router S determines whether there is currently a VN that includes only the routes whose next hops are the routers I, I and K respectively.

Block 502, a VN including the ECMP routes is created, and the destination D1 is made to point at the created VN. Then block 504 is performed.

Figure 6A:
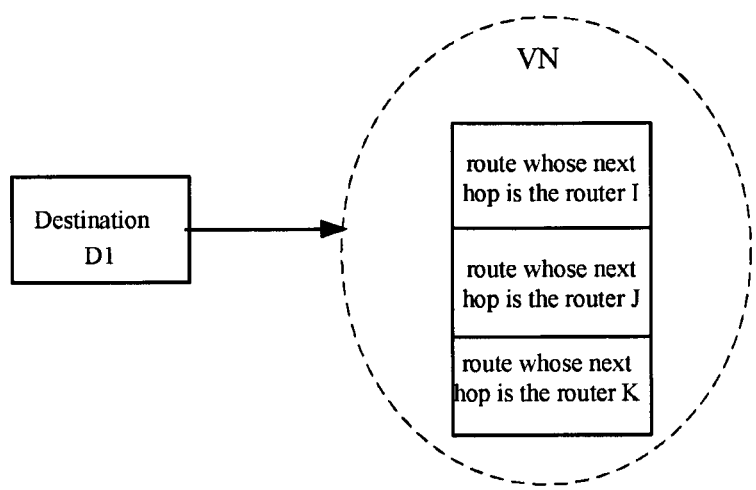
FIGS. 6a-6e are schematic drawings of the routes adopted when forwarding the traffic according to another example.

As mentioned above, if the learned ECMP routes are the routes whose next hops are the routers I, J and K respectively, then the created VN includes the routes whose next hops are the routers I, J and K, wherein these three ECMP routes are respectively arranged in three table entries contained in the created VN, subsequently, the destination D1 is made to point at said created VN, i.e., a corresponding relation between the destination D1 and said created VN is established, details of which can be seen in FIG. 6a.

Block 503, the destination D1 is made to point at the existing VN, and then block 504 is performed.

Figure 6B:
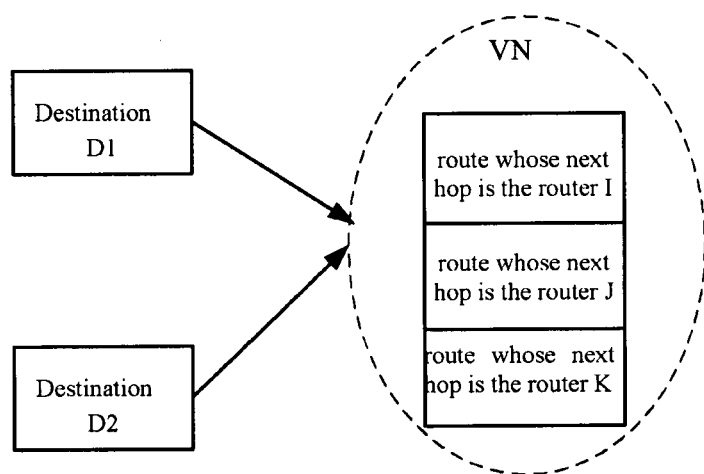

For example, before performing block 501, if the VN at which the destination D2 point is the VN determined by block 501, then when proceeding to block 503, the destination D1 is made to directly point at said VN, i.e., a corresponding relation between the destination D1 and the existing VN is established, details of which can be seen in FIG. 6b.

Blocks 501-503 relate to operations of initializing the routing information arriving at the destination D1. The following descriptions are given by taking the routing of FIG. 6b as an example, and the principle of implementation is similar to that of FIG. 6a.

Block 504, when forwarding traffic to the destination D1, the router S equally divides said traffic into three parts to be forwarded through the three ECMP routes shown in FIG. 6b.

That is to say, each of the three ECMP routes shown in FIG. 6b forwards ⅓ of the total traffic sent to the destination D1.

Block 505, if, during the traffic forwarding in block 501, the route whose next hop is the router K as shown in FIG. 6b becomes inactive, the following block 506 will be performed.

Block 506, an alternative route for replacing the inactive route is determined from the current routes that are active, and the table entry that has been set with said inactive route in FIG. 6b is modified to said alternative route.

Here, the specific operation of determining the alternative route in block 506 can be similar to that in block 304, so it will not be detailed.

Figure 6C:
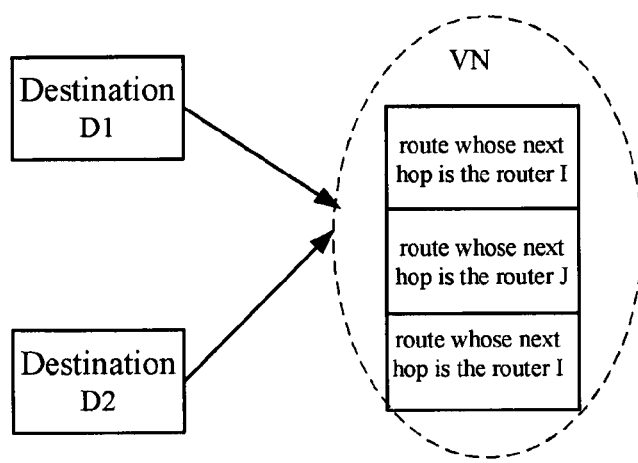

As for the modification operation in block 506, taking the determined route being the route whose next hop is the router I as an example, the table entry that has been originally set with the route whose next hop is the router K (inactive route) is modified to the route whose next hop is the router I, and details can be seen in FIG. 6c.

It shall be noted that the table entries in VN can be modified by the user at any time, and the modification is not necessarily made upon learning the routing update message, but block 506 still does not directly delete the inactive route in the VN corresponding to the destination D1, because if the inactive route in the VN is directly deleted in block 506, this might lead to the possibility that there are a plurality of VNs that are the same, which does not conform to the VN specification. For example, before performing block 506, the VN corresponding to other destinations, such as destination D3, includes two ECMP routes, which are the route whose next hop is the router I and the route whose next hop is the router J. And when it comes to block 506, if the inactive route, i.e. the route whose next hop is the router K, in the VN corresponding to the destination D1 is directly deleted, then said VN would be the same as the VN corresponding to the destination D3, and this does not conform to the VN specification. Therefore, to meet the VN specification, said block 506 is performed temporarily.

Block 507, traffic is forwarded to the destination D1 through the ECMP routes included in the VN currently corresponding to the destination D1.

The VN currently corresponding to the destination D1 is as shown in FIG. 6c. FIG. 6c shows that the VN corresponding to the destination D1 still contains three table entries, with two of the table entries being set with the route whose next hop is the router I, and the other table entry being set with the route whose next hop is the router J. As such, when proceeding to block 507, the traffic forwarded to the destination is still equally divided into three parts, which are forwarded respectively by the routes in the three table entries shown in FIG. 6c. It can be seen that when proceeding to said block 507, the traffic forwarded by the route whose next hop is the router J remains unchanged, and it still forwards ⅓ of the total traffic sent to the destination D1, while the route whose next hop is the router I needs to forward ⅔ of the total traffic sent to the destination D1, i.e. ⅓ traffic that was originally forwarded by the inactive route is added to the ⅓ traffic it used to forward.

Block 508, during the flow forwarding process in block 507, if the routing update message sent by the routing protocol module is received, it will be determined whether there is a VN that includes only the routes that are not inactive as shown in FIG. 6b among the currently existing other VNs. If yes, block 509 will be performed; and if no, block 510 will be performed.

It can be seen from FIG. 6b that the routes that are not inactive are the routes whose next hops are the routers I and J respectively, thus the determination in said block 508 is to determine whether there is a VN that includes only the routes whose next hops are the routers I and J among the currently existing other VNs.

Block 509, the destinations that point at the VN (labeled as VN1) shown in FIG. 6b, i.e. destinations D1 and D2, are made to point at the existing VN (labeled as VN2) and VN1 is deleted. Then block 511 is performed.

Suppose that the VN2 at which other destinations than destinations D1 and D2 point is the VN determined in block 508, then when proceeding to block 509, the corresponding relations between the destinations D1 and D2 and VN2 are established, and then the VN1 at which the destinations originally pointed is deleted. Details can be seen in FIG. 6d.

It shall be noted that if there is only one destination, i.e. destination D1, that originally pointed at the VN shown in FIG. 6b (labeled as VN1), then when proceeding to block 509, D1 is made to point at the VN determined in block 508 and VN1 is deleted.

Block 510, the modified table entry in VN1 is deleted.

In block 506, in order to facilitate identification of the modified table entry, a modification mark may be made thereto upon completion of the modification of the table entry. For example, the third table entry shown in FIG. 6c is modified in block 506, so a modification mark (not shown in FIG. 6c) may be made at the third table entry shown in FIG. 6c. Thus when proceeding to block 510, the table entry with a modification mark may be deleted directly, as shown in FIG. 6e. At this point, the VN shown in FIG. 6e contains only two table entries, which are respectively set with the route whose next hop is the router I and the route whose next hop is the router J.

It can be seen that block 510 does not delete the corresponding relation between the destination D1 and VN, instead it directly updates contents in VN, thereby improving the routing switch efficiency.

Figure 6D:
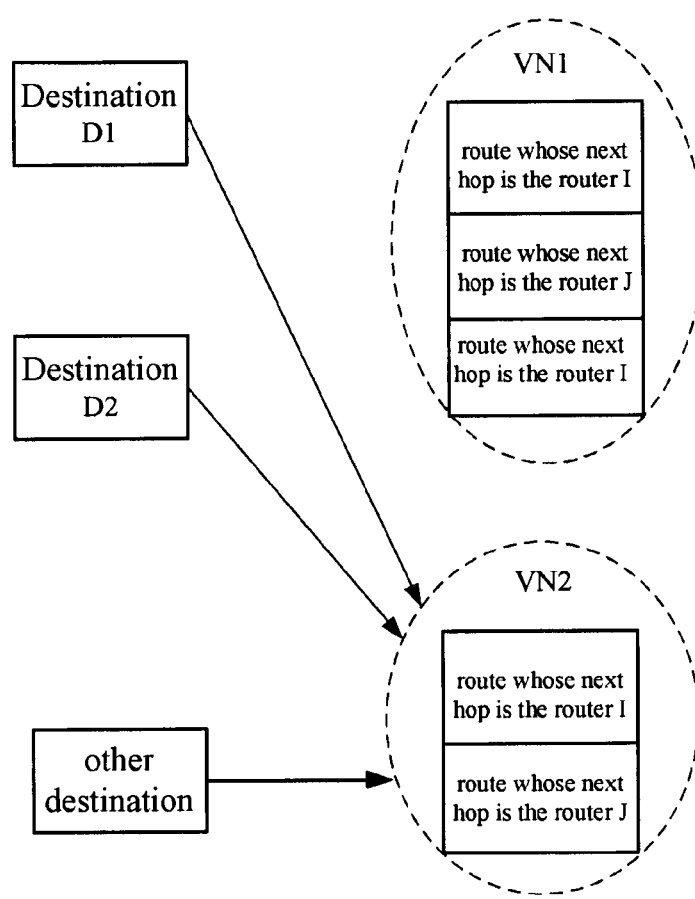
Figure 6E:
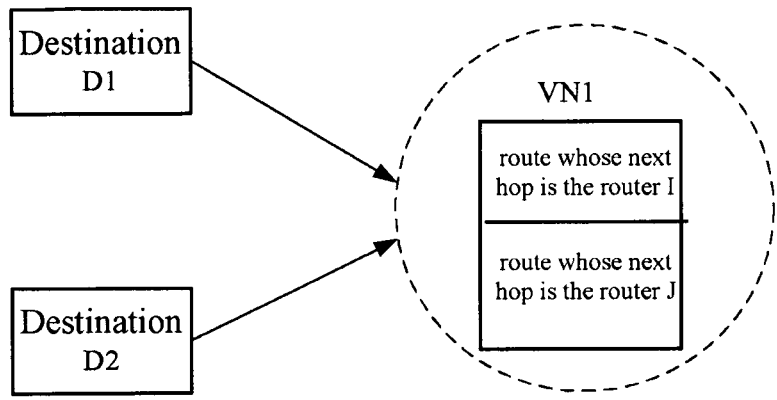

Block 511, the router S equally divides the traffic forwarded to the destination D1 into two parts to be forwarded by the two ECMP routes in the VN as shown in FIG. 6d or FIG. 6e.

In other words, each of the two ECMP routes in the VN as shown in FIG. 6d or FIG. 6e forwards ½ of the total traffic sent to the destination D1. During traffic forwarding, if one or more routes become inactive, the operation in block 505 will be performed.

The above are descriptions of the method according to examples. The network device provided according to an example will be described below.

Figure 7:
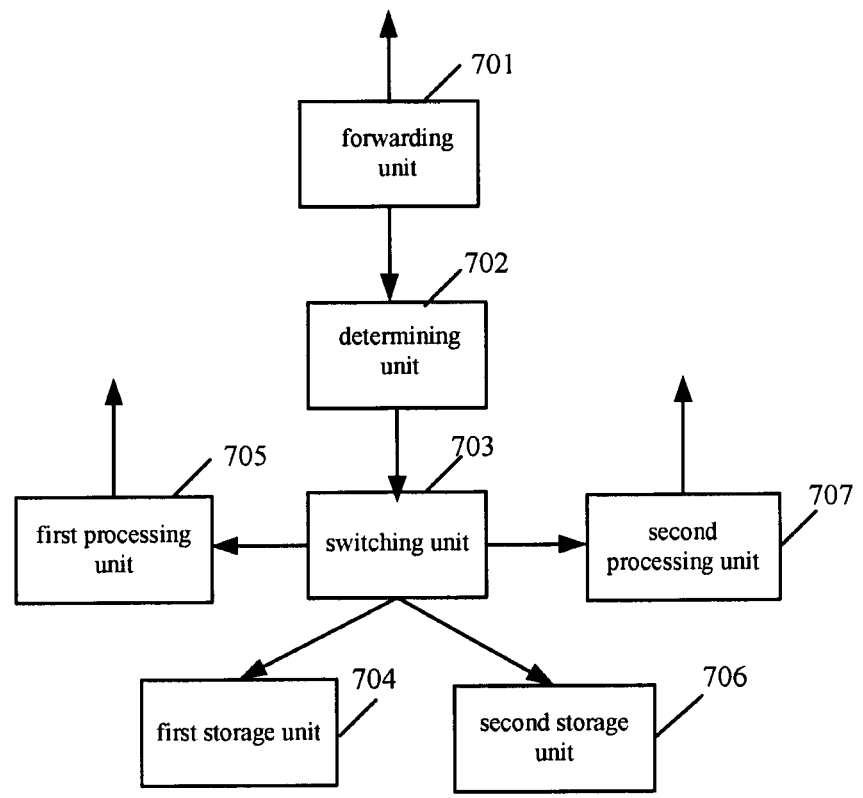
FIG. 7 is a structural diagram of the network device according to an example.

Referring to FIG. 7, which is a structural diagram of the network device provided according to an example. As shown in FIG. 7, said network device comprises:

a forwarding unit 701 to forward traffic to a destination through N ECMP routes to the destination;

a determining unit 702 to determine, if M of these routes become inactive during traffic forwarding process of the forwarding unit 701, for each inactive route an alternative route for replacing the inactive route from N-M active routes;

a switching unit 703 to modify each inactive route to the alternative route for replacing the inactive route determined by the determining unit 702, so that the traffic forwarded by the inactive route is switched onto said alternative route;

wherein said N and M are positive integer numbers, with N being greater than or equal to 2 and M being greater than or equal to 1 and smaller than N.

The network device in the example may comprises a first storage unit 704 and a first processing unit 705 in specific implementation, wherein, the first storage unit 704 is used to store the N table entries corresponding to the destination, wherein the N ECMP routes are arranged in the N table entries respectively; and the switching unit 703 is used to modify the table entry stored in the first storage unit 704 that has set with the inactive route to the alternative route for replacing said inactive route;

the first processing unit 705 is used to delete the modified table entry corresponding to the destination that is stored in the first storage unit 704 if the routing update information downwardly refreshed by the routing protocol module is received during the traffic forwarding process by the switching unit 703, and then uses the ECMP routes in the table entry currently corresponding to the destination to forward traffic to the destination; wherein the routing update information is sent by the routing protocol module after re-calculating the ECMP routes to the destination upon detecting that a route is inactive.

According to another example, as shown in FIG. 7, said network device may further comprise a second storage unit 706 and a second processing unit 707.

Wherein, the second storage unit 706 is used to store the virtual next hop VN corresponding to the destination, and wherein said N ECMP routes are respectively arranged in the N table entries contained in the VN; the switching unit 703 is used to modify the table entry set with the inactive route in the second storage unit 706 to the alternative route for replacing the inactive route.

The second processing unit 707 is used to perform the following operations: during the traffic forwarding process by the switching unit 703, if the routing update information sent by the routing protocol module is received, determining whether there is a VN that includes only the N-M routes that are active among other VNs currently stored in the second storage unit 706; if no, deleting the modified table entry in the VN corresponding to the destination; and if yes, deleting the VN originally corresponding to the destination, and making said destination correspond to other currently existing VNs, then traffic is forwarded to said destination through the ECMP routes in the VN currently corresponding to said destination, wherein the routing update information is sent by the routing protocol module after re-calculating the ECMP routes to the destination upon detecting that a route is inactive.

It can be seen from the above technical solutions that: 1) when a route becomes inactive, the traffic forwarded by the inactive route is directly switched onto the routes that are active, so that the time of traffic interruption is reduced to a sum of the time for detecting that a route is inactive and the time for replacing the inactive route with an active route (which is usually short and in some cases may be negligible), thus a fast switch of route is realized and the duration of traffic interruption is greatly reduced.

2) compared to the IP FRR technique, since it does not need to calculate a standby route in advance, network resources are saved. Besides, the complicated loop-less standby route computation is not required, so it is easy to implement and has a high performance price ratio.

All of the features disclosed in this specification (including any accompanying claims, abstract and drawings), and/or all of the processes or blocks of any method so disclosed, may be combined in any combination, except combinations where at least some of such features and/or processes or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for routing traffic by a network device, said method comprises:

when a network device forwards traffic through N equal-cost multi-path routes to a destination, if M of these routes become inactive, then for each inactive route, determining an alternative route for replacing said inactive route from N-M active routes, and modifying the inactive route to the alternative route so as to switch the traffic of the inactive route onto the alternative route, wherein said N and M are positive integer numbers, with N being greater than or equal to 2 and M being greater than or equal to 1 and smaller than N, and wherein the N equal-cost multi-path routes are respectively arranged in N table entries corresponding to the destination, and modifying the inactive route to the alternative route comprises modifying the table entry that has been set with the inactive route to the determined alternative route for replacing the inactive route; and when the network device determines routing update information, deleting the modified table entry corresponding to the destination; and then forwarding traffic to the destination using the equal-cost multi-path routes in the table entries currently corresponding to the destination, wherein the routing update information is determined from re-calculating the equal-cost multi-path routes to the destination upon detecting that a route is inactive.

2. The method of claim 1, wherein the N equal-cost multi-path routes are contained in a virtual next hop (VN) corresponding to the destination, and modifying the inactive route to the alternative route comprises:

modifying the table entry that has been set with the inactive route in the VN to the determined alternative route for replacing the inactive route.

3. The method of claim 2, wherein said method further comprises:

when the network device receives the routing update information sent by the routing protocol module, determining whether there is a VN that includes only the N-M routes that are active among other currently existing VNs;

if no, deleting the modified table entry in the VN corresponding to the destination; and if yes, deleting the VN originally corresponding to the destination, and making said destination correspond to the other currently existing VNs;

forwarding traffic to said destination through the equal-cost multi-path routes in the VN currently corresponding to said destination, wherein the routing update information is sent by the routing protocol module after re-calculating the equal-cost multi-path routes to the destination upon detecting that a route is inactive.

4. A network device for routing traffic, said network device comprises:
- a forwarding unit to forward traffic to a destination through N equal-cost multi-path routes to the destination;
- a determining unit to determine, if M of these routes are inactive during traffic forwarding by the forwarding unit, and for each inactive route, determine an alternative route for replacing the inactive route from N-M active routes;
- a switching unit to modify each inactive route to the alternative route for replacing the inactive route determined by the determining unit, so that the traffic through the inactive route forwarded by the forwarding unit is switched onto said alternative route,
- wherein said N and M are positive integer numbers, with N being greater than or equal to 2 and M being greater than or equal to 1 and smaller than N, and
- at least one storage unit to store N table entries corresponding to the destination and a virtual next hop (VN) corresponding to the destination, wherein said N equal-cost multi-path routes are respectively arranged in the N table entries contained in the VN, and
- to modify each inactive route to the alternative route, the switching unit is to modify the table entry that has been set with the inactive route to the alternative route.

5. The network device of claim 4, wherein said network device further comprises a processing unit, wherein the processing unit is to determine, upon receiving the routing update information sent by the routing protocol module, whether there is a VN that includes only the N-M routes that are active among other VNs currently stored in the second storage unit;
- if no, delete the modified table entry in the VN corresponding to the destination; and
- if yes, delete the VN originally corresponding to the destination, and make said destination correspond to other currently existing VNs; and forward traffic to said destination through the equal-cost multi-path routes in the VN currently corresponding to said destination, wherein the routing update information is sent by the routing protocol module after re-calculating the equal-cost multi-path routes to the destination upon detecting that the route is inactive.

6. A network device comprising:
- at least one processor to:
  - forward traffic to a destination through N active routes to a destination;
  - determine, if M of the N active routes become inactive, and, for each inactive route, determine an alternative route from the N-M active routes; and
  - modify each inactive route to the alternative route for replacing the inactive route, so that the traffic for the inactive route is switched onto the alternative route,
    - wherein the N and M are positive integer numbers, with N being greater than or equal to 2 and M being greater than or equal to 1 and smaller than N; and
- at least one storage unit to store N table entries corresponding to the destination, wherein the N routes are arranged in the N table entries, and the at least one processor is to modify the table entry for each inactive route to the determined alternative route,
  - wherein when the network device determines routing update information, the at least one processor is to delete each modified table entry corresponding to the destination; and forward traffic to the destination using the equal-cost multi-path routes in the table entries currently corresponding to the destination, and
  - wherein the routing update information is determined from re-calculating the equal-cost multi-path routes to the destination upon detecting that a route is inactive.

7. The network device of claim 6, wherein said N routes are contained in virtual next hop (VN), and the at least one processor is to determine, upon receiving the routing update information sent by the routing protocol module, whether there is a VN that includes only the N-M routes that are active among other VNs;
- if no, delete the modified table entry in the VN corresponding to the destination; and
- if yes, delete the VN originally corresponding to the destination, and make the destination correspond to other currently existing VNs; and forward traffic to the destination through the routes in the VN currently corresponding to the destination, wherein the routing update information is sent by the routing protocol module after re-calculating the routes to the destination upon detecting that the route is inactive.

* * * * *